(12) United States Patent
Pan et al.

(10) Patent No.: US 9,077,238 B2
(45) Date of Patent: Jul. 7, 2015

(54) CAPACITIVE REGULATION OF CHARGE PUMPS WITHOUT REFRESH OPERATION INTERRUPTION

(71) Applicant: SanDisk Technologies Inc., Plano, TX (US)

(72) Inventors: Feng Pan, Fremont, CA (US); Trung Pham, Fremont, CA (US)

(73) Assignee: SanDisk Technologies, Inc., Plano, TX (US)

( * ) Notice: Subject to any disclaimer, the term of this patent is extended or adjusted under 35 U.S.C. 154(b) by 247 days.

(21) Appl. No.: 13/926,442

(22) Filed: Jun. 25, 2013

(65) Prior Publication Data

US 2014/0375293 A1    Dec. 25, 2014

(51) Int. Cl.
*H02M 3/07*    (2006.01)

(52) U.S. Cl.
CPC ....................... *H02M 3/07* (2013.01)

(58) Field of Classification Search
CPC ........................................................ H02M 3/07
See application file for complete search history.

(56) References Cited

U.S. PATENT DOCUMENTS

| | | |
|---|---|---|
| 3,697,860 A | 10/1972 | Baker |
| 4,511,811 A | 4/1985 | Gupta |
| 4,583,157 A | 4/1986 | Kirsch et al. |
| 4,621,315 A | 11/1986 | Vaughn et al. |
| 4,636,748 A | 1/1987 | Latham |
| 4,736,121 A | 4/1988 | Cini et al. |
| 4,888,738 A | 12/1989 | Wong et al. |
| 5,140,182 A | 8/1992 | Ichimura |
| 5,168,174 A | 12/1992 | Naso et al. |
| 5,175,706 A | 12/1992 | Edme |
| 5,263,000 A | 11/1993 | Van Buskirk et al. |
| 5,392,205 A | 2/1995 | Zavaleta |
| 5,436,587 A | 7/1995 | Cernea |
| 5,483,434 A | 1/1996 | Seesink |
| 5,508,971 A | 4/1996 | Cernea et al. |
| 5,521,547 A | 5/1996 | Tsukada |
| 5,539,351 A | 7/1996 | Gilsdorf et al. |
| 5,553,030 A | 9/1996 | Tedrow et al. |
| 5,563,779 A | 10/1996 | Cave et al. |
| 5,563,825 A | 10/1996 | Cernea et al. |
| 5,568,424 A | 10/1996 | Cernea et al. |

(Continued)

FOREIGN PATENT DOCUMENTS

| | | |
|---|---|---|
| CN | 101764518 A | 6/2010 |
| CN | 101902059 | 12/2010 |

(Continued)

OTHER PUBLICATIONS

First Office Action issued for Chinese Patent Application No. 2011800614031 mailed on Feb. 3, 2015, 4 pages.

(Continued)

*Primary Examiner* — Emily P Pham
(74) *Attorney, Agent, or Firm* — Davis Wright Tremaine LLP

(57) ABSTRACT

In a charge pump system using a capacitive voltage divider, or other feedback circuit requiring periodic refreshing, in order to refresh the circuit, system operations would typically need to be suspended in order to refresh the capacitors if charge leakage begins to affect the output level. This can lead to delay and power inefficiencies. To overcome this, two feedback circuits are used so that while one is active, the other can have its capacitors' state refreshed. By alternating the two networks, delay can be avoided and power use reduced.

10 Claims, 3 Drawing Sheets

(56) References Cited

U.S. PATENT DOCUMENTS

| | | |
|---|---|---|
| 5,570,315 A | 10/1996 | Tanaka et al. |
| 5,592,420 A | 1/1997 | Cernea et al. |
| 5,596,532 A | 1/1997 | Cernea et al. |
| 5,602,794 A | 2/1997 | Javanifard et al. |
| 5,621,685 A | 4/1997 | Cernea et al. |
| 5,625,544 A | 4/1997 | Kowshik et al. |
| 5,644,534 A | 7/1997 | Soejima |
| 5,693,570 A | 12/1997 | Cernea et al. |
| 5,712,778 A | 1/1998 | Moon |
| 5,732,039 A | 3/1998 | Javanifard et al. |
| 5,734,286 A | 3/1998 | Takeyama et al. |
| 5,767,735 A | 6/1998 | Javanifard et al. |
| 5,781,473 A | 7/1998 | Javanifard et al. |
| 5,801,987 A | 9/1998 | Dinh |
| 5,812,017 A | 9/1998 | Golla et al. |
| 5,818,766 A | 10/1998 | Song |
| 5,828,596 A | 10/1998 | Takata et al. |
| 5,903,495 A | 5/1999 | Takeuchi et al. |
| 5,943,226 A | 8/1999 | Kim |
| 5,945,870 A | 8/1999 | Chu et al. |
| 5,969,565 A | 10/1999 | Naganawa |
| 5,969,988 A | 10/1999 | Tanzawa et al. |
| 5,973,546 A | 10/1999 | Le et al. |
| 5,982,222 A | 11/1999 | Kyung |
| 6,008,690 A | 12/1999 | Takeshima et al. |
| 6,016,073 A | 1/2000 | Ghilardelli et al. |
| 6,018,264 A | 1/2000 | Jin |
| 6,023,187 A | 2/2000 | Camacho et al. |
| 6,026,002 A | 2/2000 | Viehmann |
| 6,046,935 A | 4/2000 | Takeuchi et al. |
| 6,104,225 A | 8/2000 | Taguchi et al. |
| 6,107,862 A | 8/2000 | Mukainakano et al. |
| 6,134,145 A | 10/2000 | Wong |
| 6,147,566 A | 11/2000 | Pizzuto et al. |
| 6,151,229 A | 11/2000 | Taub et al. |
| 6,154,088 A | 11/2000 | Chevallier et al. |
| 6,157,242 A | 12/2000 | Fukui |
| 6,188,590 B1 | 2/2001 | Chang et al. |
| 6,198,645 B1 | 3/2001 | Kotowski et al. |
| 6,208,198 B1 | 3/2001 | Lee |
| 6,249,445 B1 | 6/2001 | Sugasawa |
| 6,249,898 B1 | 6/2001 | Koh et al. |
| 6,275,096 B1 | 8/2001 | Hsu et al. |
| 6,278,294 B1 | 8/2001 | Taniguchi |
| 6,285,622 B1 | 9/2001 | Haraguchi et al. |
| 6,288,601 B1 | 9/2001 | Tomishima |
| 6,297,687 B1 | 10/2001 | Sugimura |
| 6,307,425 B1 | 10/2001 | Chevallier et al. |
| 6,314,025 B1 | 11/2001 | Wong |
| 6,320,428 B1 | 11/2001 | Atsumi et al. |
| 6,320,796 B1 | 11/2001 | Voo et al. |
| 6,320,797 B1 | 11/2001 | Liu |
| 6,329,869 B1 | 12/2001 | Matano |
| 6,344,959 B1 | 2/2002 | Milazzo |
| 6,344,984 B1 | 2/2002 | Miyazaki |
| 6,356,062 B1 | 3/2002 | Elmhurst et al. |
| 6,359,798 B1 | 3/2002 | Han et al. |
| 6,369,642 B1 | 4/2002 | Zeng et al. |
| 6,370,075 B1 | 4/2002 | Haeberli et al. |
| 6,385,107 B1 | 5/2002 | Bedarida et al. |
| 6,400,202 B1 | 6/2002 | Fifield et al. |
| 6,404,274 B1 | 6/2002 | Hosono et al. |
| 6,411,157 B1 | 6/2002 | Hsu et al. |
| 6,424,570 B1 | 7/2002 | Le et al. |
| 6,445,243 B2 | 9/2002 | Myono |
| 6,456,154 B2 | 9/2002 | Sugimura |
| 6,456,170 B1 | 9/2002 | Segawa et al. |
| 6,476,666 B1 | 11/2002 | Palusa et al. |
| 6,486,728 B2 | 11/2002 | Kleveland |
| 6,518,830 B2 | 2/2003 | Gariboldi et al. |
| 6,522,191 B1 | 2/2003 | Cha et al. |
| 6,525,614 B2 | 2/2003 | Tanimoto |
| 6,525,949 B1 | 2/2003 | Johnson et al. |
| 6,531,792 B2 | 3/2003 | Oshio |
| 6,538,930 B2 | 3/2003 | Ishii et al. |
| 6,545,529 B2 | 4/2003 | Kim |
| 6,556,465 B2 | 4/2003 | Wong et al. |
| 6,577,535 B2 | 6/2003 | Pasternak |
| 6,606,267 B2 | 8/2003 | Wong |
| 6,661,682 B2 | 12/2003 | Kim et al. |
| 6,703,891 B2 | 3/2004 | Tanaka |
| 6,724,241 B1 | 4/2004 | Bedarida et al. |
| 6,734,718 B1 | 5/2004 | Pan |
| 6,737,907 B2 | 5/2004 | Hsu et al. |
| 6,760,262 B2 | 7/2004 | Haeberli et al. |
| 6,762,640 B2 | 7/2004 | Katsuhisa |
| 6,781,440 B2 | 8/2004 | Huang |
| 6,798,274 B2 | 9/2004 | Tanimoto |
| 6,819,162 B2 | 11/2004 | Pelliconi |
| 6,834,001 B2 | 12/2004 | Myono |
| 6,859,091 B1 | 2/2005 | Nicholson et al. |
| 6,878,981 B2 | 4/2005 | Eshel |
| 6,891,764 B2 | 5/2005 | Li |
| 6,894,554 B2 | 5/2005 | Ito |
| 6,922,096 B2 | 7/2005 | Cernea |
| 6,927,441 B2 | 8/2005 | Pappalardo et al. |
| 6,933,768 B2 | 8/2005 | Hausmann |
| 6,944,058 B2 | 9/2005 | Wong |
| 6,954,386 B2 | 10/2005 | Narui et al. |
| 6,975,135 B1 | 12/2005 | Bui |
| 6,985,397 B2 | 1/2006 | Tokui et al. |
| 6,990,031 B2 | 1/2006 | Hashimoto et al. |
| 6,995,603 B2 | 2/2006 | Chen et al. |
| 7,002,381 B1 | 2/2006 | Chung |
| 7,023,260 B2 | 4/2006 | Thorp et al. |
| 7,030,683 B2 | 4/2006 | Pan et al. |
| 7,092,263 B2 | 8/2006 | Chang |
| 7,113,023 B2 | 9/2006 | Cernea |
| 7,116,154 B2 | 10/2006 | Guo |
| 7,116,155 B2 | 10/2006 | Pan |
| 7,120,051 B2 | 10/2006 | Gorobets et al. |
| 7,123,078 B2 | 10/2006 | Seo |
| 7,129,538 B2 | 10/2006 | Lee et al. |
| 7,129,759 B2 | 10/2006 | Fukami |
| 7,135,910 B2 | 11/2006 | Cernea |
| 7,135,911 B2 | 11/2006 | Imamiya |
| 7,180,794 B2 | 2/2007 | Matsue |
| 7,205,682 B2 | 4/2007 | Kuramori |
| 7,208,996 B2 | 4/2007 | Suzuki et al. |
| 7,215,179 B2 | 5/2007 | Yamazoe et al. |
| 7,224,591 B2 | 5/2007 | Kaishita et al. |
| 7,227,780 B2 | 6/2007 | Komori et al. |
| 7,239,192 B2 | 7/2007 | Tailliet |
| 7,253,675 B2 | 8/2007 | Aksin et al. |
| 7,253,676 B2 | 8/2007 | Fukuda et al. |
| 7,259,612 B2 | 8/2007 | Saether |
| 7,276,960 B2 | 10/2007 | Peschke |
| 7,279,957 B2 | 10/2007 | Yen |
| 7,345,928 B2 | 3/2008 | Li |
| 7,348,829 B2 | 3/2008 | Choy et al. |
| 7,368,979 B2 | 5/2008 | Govindu et al. |
| 7,397,677 B1 | 7/2008 | Collins et al. |
| 7,466,188 B2 | 12/2008 | Fifield |
| 7,468,628 B2 | 12/2008 | Im et al. |
| 7,495,500 B2 | 2/2009 | Al-Shamma et al. |
| 7,521,978 B2 | 4/2009 | Kim et al. |
| 7,554,311 B2 | 6/2009 | Pan |
| 7,579,902 B2 | 8/2009 | Frulio et al. |
| 7,579,903 B2 | 8/2009 | Oku |
| 7,602,233 B2 | 10/2009 | Pietri et al. |
| 7,667,529 B2 | 2/2010 | Consuelo et al. |
| 7,671,572 B2 | 3/2010 | Chung |
| 7,696,812 B2 | 4/2010 | Al-Shamma et al. |
| 7,772,914 B2 | 8/2010 | Jung |
| 7,795,952 B2 | 9/2010 | Lui et al. |
| 7,830,203 B2 | 11/2010 | Chang et al. |
| 7,928,796 B2 | 4/2011 | Namekawa |
| 7,944,277 B1 | 5/2011 | Sinitsky et al. |
| 7,956,675 B2 | 6/2011 | Saitoh et al. |
| 8,040,174 B2 | 10/2011 | Likhterov |
| 8,093,953 B2 | 1/2012 | Pierdomenico et al. |
| 8,159,091 B2 | 4/2012 | Yeates |
| 8,193,853 B2 | 6/2012 | Hsieh et al. |
| 8,242,834 B2 | 8/2012 | Chuang et al. |

(56) References Cited

U.S. PATENT DOCUMENTS

| | | |
|---|---|---|
| 8,339,183 B2 | 12/2012 | Htoo et al. |
| 8,395,440 B2 | 3/2013 | Shandhu et al. |
| 8,604,868 B2 | 12/2013 | Ucciardello et al. |
| 8,643,358 B2 | 2/2014 | Yoon |
| 2002/0008566 A1 | 1/2002 | Taito et al. |
| 2002/0014908 A1 | 2/2002 | Lauterbach |
| 2002/0075063 A1 | 6/2002 | Hwang |
| 2002/0075706 A1 | 6/2002 | Foss et al. |
| 2002/0101744 A1 | 8/2002 | DeMone |
| 2002/0130701 A1 | 9/2002 | Kleveland |
| 2002/0130704 A1 | 9/2002 | Myono et al. |
| 2002/0140463 A1 | 10/2002 | Cheung |
| 2002/0163376 A1 | 11/2002 | Pappalardo et al. |
| 2003/0128560 A1 | 7/2003 | Saiki et al. |
| 2003/0214346 A1 | 11/2003 | Pelliconi |
| 2004/0046603 A1 | 3/2004 | Bedarida et al. |
| 2005/0024125 A1 | 2/2005 | McNitt et al. |
| 2005/0030088 A1 | 2/2005 | Cernea |
| 2005/0093614 A1 | 5/2005 | Lee |
| 2005/0195017 A1 | 9/2005 | Chen et al. |
| 2005/0237103 A1 | 10/2005 | Cernea |
| 2005/0248386 A1 | 11/2005 | Pan et al. |
| 2006/0114053 A1 | 6/2006 | Sohara et al. |
| 2006/0119393 A1 | 6/2006 | Hua et al. |
| 2006/0244518 A1 | 11/2006 | Byeon et al. |
| 2006/0250177 A1 | 11/2006 | Thorp et al. |
| 2007/0001745 A1 | 1/2007 | Yen |
| 2007/0053216 A1 | 3/2007 | Alenin |
| 2007/0069805 A1 | 3/2007 | Choi et al. |
| 2007/0126494 A1 | 6/2007 | Pan |
| 2007/0139099 A1 | 6/2007 | Pan |
| 2007/0139100 A1 | 6/2007 | Pan |
| 2007/0152738 A1 | 7/2007 | Stopel et al. |
| 2007/0210853 A1 | 9/2007 | Maejima |
| 2007/0211502 A1 | 9/2007 | Komiya |
| 2007/0222498 A1 | 9/2007 | Choy et al. |
| 2007/0229149 A1 | 10/2007 | Pan et al. |
| 2008/0024096 A1 | 1/2008 | Pan |
| 2008/0024198 A1 | 1/2008 | Bitonti et al. |
| 2008/0042731 A1 | 2/2008 | Daga et al. |
| 2008/0068067 A1 | 3/2008 | Govindu et al. |
| 2008/0111604 A1 | 5/2008 | Boerstler et al. |
| 2008/0116963 A1 | 5/2008 | Jung |
| 2008/0136500 A1 | 6/2008 | Frulio et al. |
| 2008/0157731 A1 | 7/2008 | Pan |
| 2008/0157852 A1 | 7/2008 | Pan |
| 2008/0157859 A1 | 7/2008 | Pan |
| 2008/0218134 A1 | 9/2008 | Kawakami |
| 2008/0239802 A1 | 10/2008 | Thorpe |
| 2008/0239856 A1 | 10/2008 | Thorpe |
| 2008/0278222 A1 | 11/2008 | Conti et al. |
| 2008/0307342 A1 | 12/2008 | Furches et al. |
| 2009/0033306 A1 | 2/2009 | Tanzawa |
| 2009/0051413 A1 | 2/2009 | Chu et al. |
| 2009/0058506 A1 | 3/2009 | Nandi et al. |
| 2009/0058507 A1 | 3/2009 | Nandi et al. |
| 2009/0091366 A1 | 4/2009 | Baek et al. |
| 2009/0121780 A1 | 5/2009 | Chen et al. |
| 2009/0121782 A1 | 5/2009 | Oyama et al. |
| 2009/0153230 A1 | 6/2009 | Pan et al. |
| 2009/0153231 A1 | 6/2009 | Pan et al. |
| 2009/0153232 A1 | 6/2009 | Fort et al. |
| 2009/0167418 A1 | 7/2009 | Ragavan |
| 2009/0174441 A1 | 7/2009 | Gebara et al. |
| 2009/0184697 A1 | 7/2009 | Park |
| 2009/0219077 A1 | 9/2009 | Pietri et al. |
| 2009/0315598 A1 | 12/2009 | Namekawa |
| 2009/0315616 A1 | 12/2009 | Nguyen et al. |
| 2009/0322413 A1 | 12/2009 | Huynh et al. |
| 2010/0019832 A1 | 1/2010 | Pan |
| 2010/0033232 A1 | 2/2010 | Pan |
| 2010/0074034 A1 | 3/2010 | Cazzaniga |
| 2010/0085794 A1 | 4/2010 | Chen et al. |
| 2010/0118625 A1 | 5/2010 | Matano |
| 2010/0127761 A1 | 5/2010 | Matano |
| 2010/0244935 A1 | 9/2010 | Kim et al. |
| 2010/0283549 A1 | 11/2010 | Wang |
| 2010/0302877 A1 | 12/2010 | Bang |
| 2011/0026329 A1 | 2/2011 | Wada |
| 2011/0133821 A1 | 6/2011 | Honda |
| 2011/1015680 | 6/2011 | Yap et al. |
| 2011/0176370 A1 | 7/2011 | Izumi et al. |
| 2011/0254615 A1 | 10/2011 | Raghunathan et al. |
| 2012/0230071 A1 | 9/2012 | Kaneda |
| 2012/0274394 A1 | 11/2012 | Chan |
| 2013/0162229 A1 | 6/2013 | Chan |
| 2013/0181521 A1 | 7/2013 | Khlat |
| 2014/0085985 A1 | 3/2014 | Pan et al. |
| 2014/0375293 A1 | 12/2014 | Pan et al. |

FOREIGN PATENT DOCUMENTS

| | | |
|---|---|---|
| DE | 10 2007 026290 | 7/2008 |
| EP | 0 382 929 A | 8/1990 |
| EP | 0 780 515 A | 6/1997 |
| JP | 2007-020268 | 1/2007 |
| WO | 01/06336 A1 | 1/2001 |
| WO | WO 2006/132757 | 12/2006 |

OTHER PUBLICATIONS

Feng Pan et al., "Charge Pump Circuit Design", McGraw-Hill, 2006, 26 pages.

U.S. Appl. No. 12/506,998 entitled "Charge Pump with Current Based Regulation" filed Jul. 21, 2009, 21 pages.

U.S. Appl. No. 12/643,385 entitled "Multi-Stage Charge Pump with Variable Number of Boosting Stages" filed Dec. 9, 2009, 33 pages.

Ang et al., "An On-Chip Voltage Regulator Using Switched Decoupling Capacitors," Feb. 2000 IEEE International Solid-State Circuits Conference, 2 pages.

Pylarinos et al., "Charge Pumps: An Overview," Department of Electrical and Computer Engineering, University of Toronto, Proceedings of Symposium May 2003, 7 pages.

Notice of Allowance in U.S. Appl. No. 14/041,522, mailed May 19, 2015, 8 pages.

Charging Half Cycle

Transfer Half Cycle

CAPACITIVE REGULATION OF CHARGE PUMPS WITHOUT REFRESH OPERATION INTERRUPTION

FIELD OF THE INVENTION

This invention pertains generally to the field of charge pumps and more particularly to techniques for regulating charge pumps.

BACKGROUND

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be 2* $V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to save on current consumption and reduce the amount ripple in the output of the pump.

SUMMARY OF THE INVENTION

A charge pump circuit system includes a charge pump circuit responsive to an enable signal to generate an output voltage from an input voltage and regulation circuitry. The regulation circuitry includes a comparator, a multiplex circuit, first and second feedback networks, and control circuitry. The comparator is connected to receive a reference voltage at a first input and a selected feedback level at a second input and generate from these inputs the enable signal as an output. The multiplex circuit has as inputs a first feedback level and a second feedback level, where the multiplex circuit provides one of the first and second feedback levels as the selected feedback level in response to a first control signal. The first and second feedback networks are each connectable to receive the output voltage and respectively provide the first and second feedback levels from a first node of a respective capacitive voltage divider. Each of the first and second feedback networks can be operated in an active mode or in a reset mode in response to one or more second control signals. The control circuitry generates the first and second control signals, whereby the second feedback network is in the reset mode when the first feedback network is in the active mode and the first feedback network is in the reset mode when the second feedback network is in the active mode, and where based on the control signals the control circuitry alternates which of the first and second feedback networks is in the active mode and the multiplex circuit provides the active one of the feedback networks as the selected feedback level.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

The techniques presented here are widely applicable to various charge pump designs that use capacitive regulation. In capacitive regulation, when capacitors are connected in series in the feedback network, the feedback network relies on conservation of a charge principle to sample the output voltage. Due to junction leakage, sub-threshold leakage, or a combination of these, conservation of charge cannot be held over long times without introducing significant output error. Because of this, operation of the pump system needs to be interrupted at periodic intervals (based on the leakage rate on the intermediate node of capacitors and their size) for the capacitors to be refreshed periodically if the operation is long compared with leakage tolerance. Without this refresh, the violation of charge conservation would introduce significant error in output being regulated. This need to refresh can significantly affect the performance and power impact of the pump system as operations are interrupted in order to refresh all nodes of the capacitors before the next regulation.

The following is primarily concerned with the regulation circuitry of charge pump systems rather than the details of the pump itself. For example, the pump can be based on a Dickson-type pump, voltage doubles, and so on. More detail on various pumps and pump system within which the following concepts can be applied can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,922,096; 7,030,683; 7,554,311; 7,368,979; 7,795,952; 7,135,910; 7,973,592; and 7,969,235; US Patent Publication numbers 2009-0153230-A1; 2009-0153232-A1; 2009-0315616-A1; 2009-0322413-A1; 2009-0058506-A1; US-2011-0148509-A1; 2007-0126494-A1; 2007-0139099-A1; 2008-0307342 A1; 2009-0058507 A1; 2012-0154023; 2012-0154022; and 2013-0063118; and U.S. patent application Ser. Nos. 13/618,482; 13/628,465; 13/886,066; and 13/921,072.

Figure 1A:
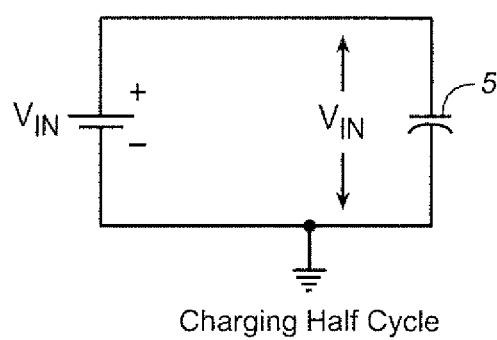
FIG. 1a is a simplified circuit diagram of the charging half cycle in a generic charge pump.
Figure 1B:
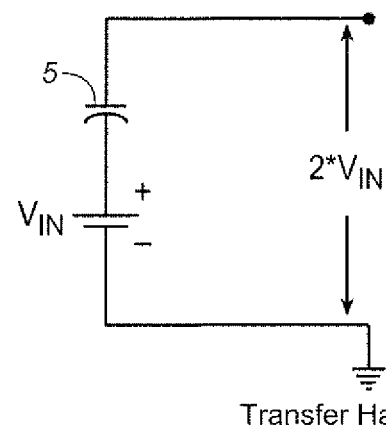
FIG. 1b is a simplified circuit diagram of the transfer half cycle in a generic charge pump.
Figure 2:
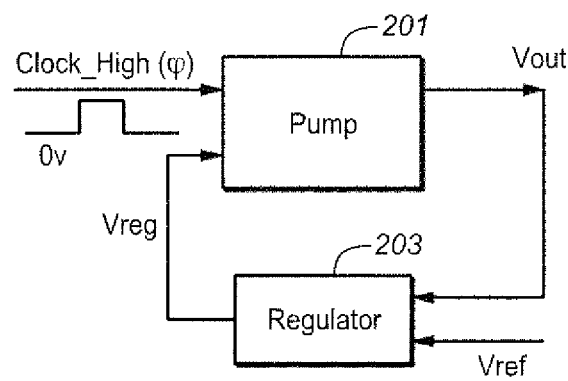
FIG. 2 is a top-level block diagram for a regulated charge pump.

FIG. 2 is a top-level block diagram of a typical charge pump using an output voltage based regulation scheme. As shown in FIG. 2, the pump 201 has as inputs a clock signal and a voltage Vreg and provides an output Vout. The clock generation circuit is not explicitly shown in FIG. 2, although it may be considered part of the charge pump system in some embodiments or taken as an external input. The high (Vdd) and low (ground) connections are also not explicitly shown. The voltage Vreg is provided by the regulator 203, which has as inputs a reference voltage Vref from an external voltage source and the output voltage Vout. The regulator block 203 generates feedback control signal Vreg such that the desired value of Vout can be obtained. The pump section 201 may have any of various designs for charge pumps, such as described in the various references cited above including charge doubler-type circuits with cross-coupled elements as well as the Dickson-type pumps described below for the exemplary embodiments. (A charge pump is typically taken to refer to both the pump portion 201 and the regulator 203, when a regulator is included, although in some usages "charge pump" refers to just the pump section 201. In the following, the terminology "charge pump system" will often be used to describe pump itself as well as any regulation or other peripheral elements.) The regulator block 203 typically compares the Vref to the Vout value by using a voltage divider circuit. The voltage divider can be a resistive divider, a capacitive divider, or some combination (see, for example, U.S. Pat. No. 7,554,311).

Using a capacitive feedback network has the advantage of having no DC current load to the output supply, something that is a particular advantage in low power applications. The feedback regulation is then based on the principle of charge conservation at the node of the capacitive divider. As noted above, for relatively long operations, junction or sub-threshold voltage leakage may inject or leak charge away from the divider's node, violating charge conservation over time. If the time of the operation exceeds the maximum allowed charge leakage and derived error on the regulated output voltage, the operation needs to be suspended and the nodes of the capacitors reset before resuming the operation. For example, in an NAND flash memory the refresh constraint can limit the maximum pulse time of an erase operation, so that an erase operation would need to be broken down into multiple pulses. Although discussed here in the context of a purely capacitive divider, this can also apply to other dividers with capacitive elements that are otherwise not sufficiently refreshed.

Figure 3A:
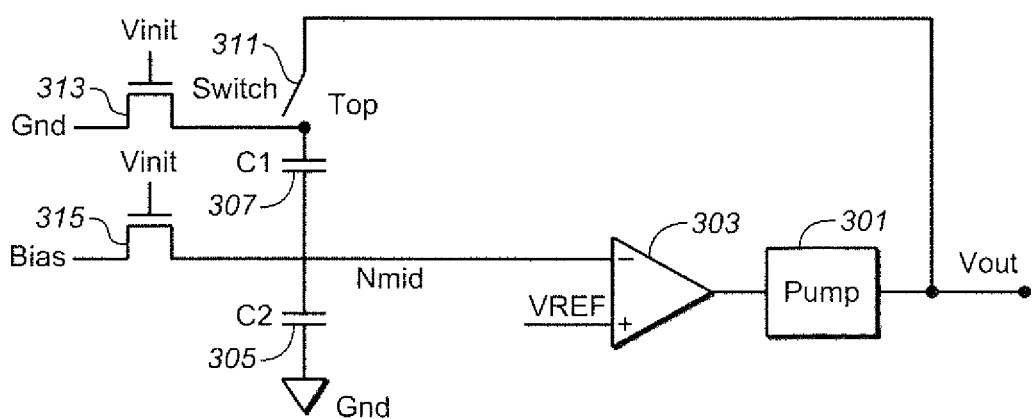
FIGS. 3A-C illustrate a charge pump system using a capacitive voltage divider and some possible sources of leakage.
Figure 3B:
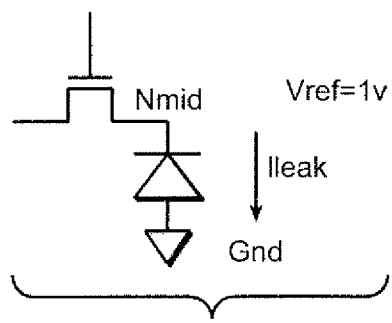
Figure 3C:
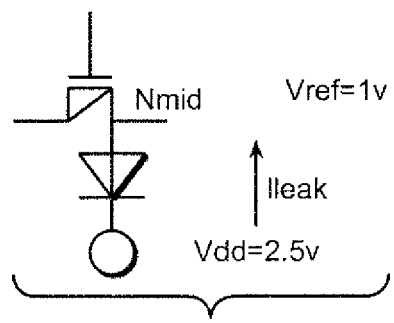

This can be illustrated with respect to FIGS. 3A-C. FIG. 3A schematically illustrates a charge pump system where a pump 301 supplies an output voltage Vout based upon the output of the comparator 303. The comparator has a reference voltage VREF as one input and is connected to a node Nmid of a voltage divider connected to provide feedback from the Vout level. The voltage divider has a first capacitor C1 307 connected between the Vout level and the Nmid node and a second capacitor C2 305 connected between Nmid and ground, When operating under regulation, the level on Nmid is compared to Vref to control the pump's operation.

Some of the sources of the leakage are illustrated in FIGS. 3B and 3C. FIG. 3B shows the case of NMOS junction leakage, where a current Ileak drains charge off of Nmid to ground for some exemplary values. FIG. 3C similarly illustrates PMOS junction leakage where the current flows on to Nmid. Due this leakage, the capacitors may eventually need refreshing. This refreshing can be accomplished by opening the switch 311, connecting the Top node to ground through transistor 313 and the node Nmid to the level Bias through transistor 315. Once the capacitors are reset, the nodes Top and Nmid can be disconnected from ground and Bias, the switch 311 closed, and the pump can resume operation. Initially, the charge on the Nmid node is:

$$Q\text{nmid(initial)} = V\text{bias}(C1+C2)$$

while under regulation (assuming the loop gain of charge pump is high enough), Vnmid will be same as VREF. Then:

$$Q\text{nmid(final)} = C1*(V\text{ref}-V\text{out})C2*V\text{ref}$$

Due to the charge conservation principle, $$V\text{out} = (C1+C2)*(V\text{ref}-V\text{bias})/C1$$

For example, taking Vbias=0V, Vref=1V, C1=1 pF, and C2=2 pF, this gives Vout=(1+2)*(1-0)/1=3V. If charge conservation is not held, then the regulation level on the output will deviate from this target value over time. Interrupting operations for a reset will impact performance. This will waste power as the circuits and voltages need to reset and the restart the system again will need all the voltages to ramp back up to regulation levels.

The techniques described here can be applied to both positive and negative charge pumps. For example in the positive charge pump case, Vbias can be taken as 0V and Vref as 1.0-1.2V. For a negative pump, Vbias can be set at 1.0V-1.2V and Vref can be in the 0-0.2V range. The actual levels used can be based on the common mode input range of the comparator used in the design.

Figure 4A:
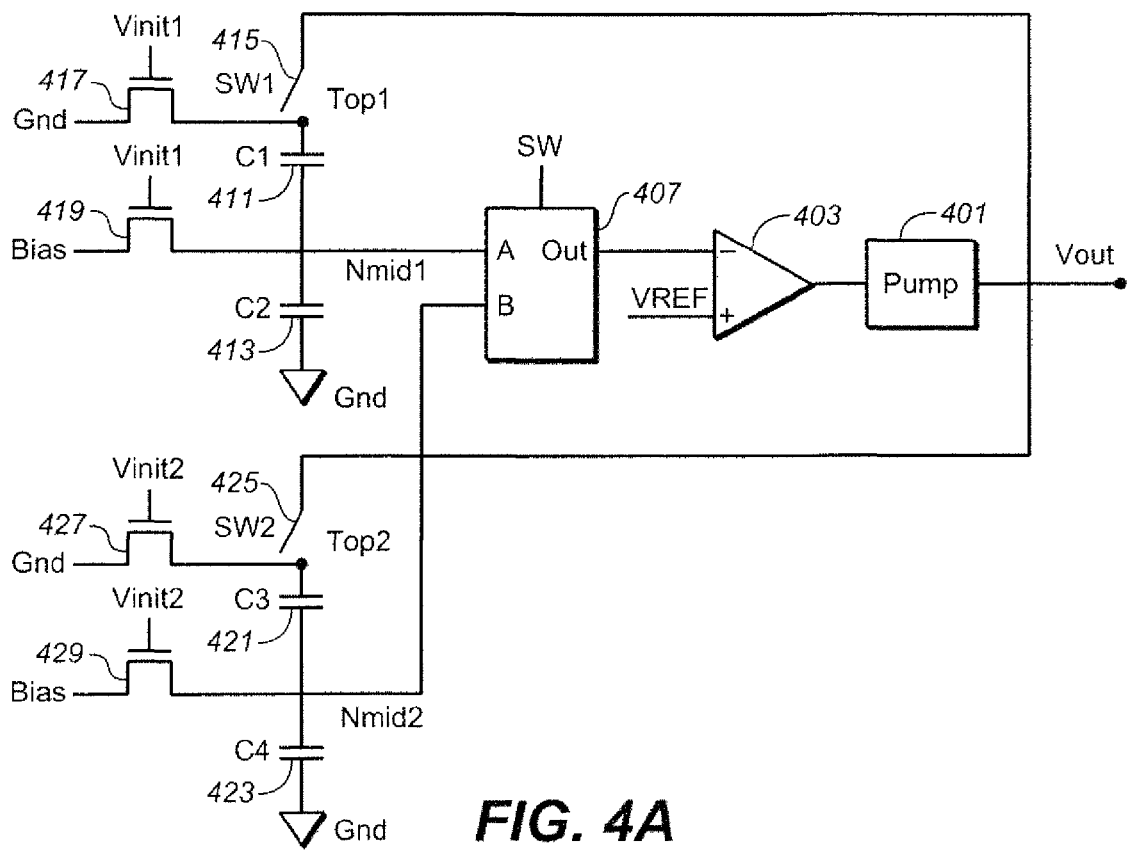
FIGS. 4A and B illustrate an exemplary embodiment of a charge pump system.
Figure 4B:
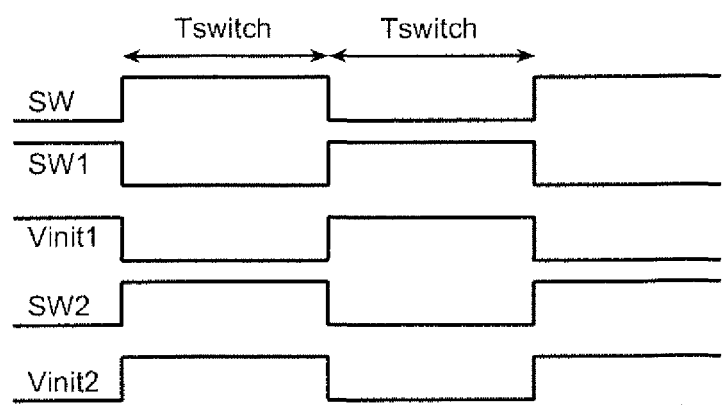

FIGS. 4A and 4B illustrate an exemplary embodiment of a circuit to overcome these difficulties. As before, FIG. 4A shows the output of the pump 401 is governed by the output of a comparator 403 that has a reference value Vref at one input and feedback from the output at the other input. Now, however there are two sets of capacitive dividers, one formed of capacitors C1 411 and capacitor C2 413 and the other formed of capacitors C3 421 and C4 423. Each of the dividers has its own reset circuit, the switch SW1 415 and transistors 417 and 419 controlled by Vinit1 for one and the switch SW2 425 and transistors 427 and 429 controlled by Vinit2 for the other. The feedback voltage is switched between the different dividers based on a signal SW supplied to the multiplex circuit 407. The signals SW and well as Vint1, Vint2 and the signals controlling SW1 and SW2 can be provided by control circuitry (not illustrated) based, for example, a multiple of some system clock. While one of the dividers is working, the other can be reset. The period of the switching (Tswitch) can be determined based on leakage calculations and capacitor size, and derived based on the allowable output error that the system is allowed to tolerate. By alternating which of the dividers is active and which is being reset, the pump's operation can be maintained without interruption needed to reset pump and load. This allows the system to maximize performance and power savings.

FIG. 4B illustrates an example of the control signals involved. As shown at top, the SW to the multiplex circuit alternates between high (when A is connected) and low (when B is connected) with a period Tswitch. When the top feedback loop is active, the switch SW1 415 is closed (SW1 low in FIG. 4B, SW1 is active low) to complete the feedback loop and the transistors 417 and 419 are turned off (Vint1 low). While the top loop is active, the bottom divider can be reset by openning SW2 425 (SW2 high in FIG. 4B, SW2 is active low) and connecting the Top2 node to ground and Nmid2 to Bias by having Vint2 high. The signals are then swapped to have the bottom loop at B active and the top loops capacitors can be reset.

FIGS. 4A and 4B illustrate an example using a fairly simple, purely capacitive voltage divider, but the techniques can be applied to other feedback loops that can benefit from periodic refreshing, such as the sort of hybrid arrangement of U.S. Pat. No. 7,554,311. For any of these variations, the describe approach allows for operations to continue with needing to stop for reset, allowing the systems output to continue under regulation without interruption. Consequently, there is no extra delay or power required for this reason. This makes the aspects present here particularly useful many charge pump applications, such as for peripheral circuitry on NAND or other non-volatile memories, for example.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump system, including
  a charge pump circuit responsive to a enable signal to generate an output voltage from an input voltage; and
  regulation circuitry, including
    a comparator connected to receive a reference voltage at a first input and a selected feedback level at a second input and generate therefrom the enable signal as an output;
    a multiplex circuit having as inputs a first feedback level and a second feedback level, where the multiplex circuit provides one of the first and second feedback levels as the selected feedback level in response to a first control signal;
    first and second feedback networks each connectable to receive the output voltage and respectively provide the first and second feedback levels from a first node of a respective capacitive voltage divider, wherein each of the first and second feedback networks can be operated in an active mode or in a reset mode in response to one or more second control signals; and
    control circuitry to generate the first and second control signals, whereby the second feedback network is in the reset mode when the first feedback network is in the active mode and the first feedback network is in the reset mode when the second feedback network is in the active mode, and where based on the control signals the control circuitry alternates which of the first and second feedback networks is in the active mode and the multiplex circuit provides the active one of the feedback networks as the selected feedback level.

2. The charge pump circuit of claim 1, wherein each of the first and second feedback networks comprise:
  a first capacitor connected between the first node and an input node; and
  a second capacitor connected between the first node and ground, wherein in the active mode the input node is connected to receive the output voltage and in the reset mode the input node is connected to ground and the first node is connected to a bias voltage.

3. The charge pump circuit of claim 2, wherein for each of the first and second feedback networks the input node is connectable to the output voltage through a switch controller by one of the second control signals.

4. The charge pump circuit of claim 2, wherein for each of the first and second feedback networks the input node is connectable to ground through a first transistor and the first node is connectable to a bias voltage through a second transistor, the first and second transistors having control gates connected to receive one of the second control signals.

5. The charge pump circuit of claim 2, wherein the charge pump generates a positive output voltage.

6. The charge pump circuit of claim 5, wherein the bias voltage is ground.

7. The charge pump circuit of claim 5, wherein the reference voltage is in a range of 1.0V to 1.2V.

8. The charge pump circuit of claim 2, wherein the charge pump generates a negative output voltage.

9. The charge pump circuit of claim 8, wherein the bias voltage is ground is in a range of 1.0V to 1.2V.

10. The charge pump circuit of claim 8, wherein the reference voltage in a range of 0V to 0.2V

* * * * *